United States Patent [19]

Carpenter, Jr.

[11] Patent Number: 4,743,997
[45] Date of Patent: May 10, 1988

[54] HIGH-VOLTAGE SYSTEMS SURGE ELIMINATORS FOR TRANSMISSION LINES AND DISTRIBUTION STATION PROTECTION

[76] Inventor: Roy B. Carpenter, Jr., 9444 Tierra Blanca, Whittier, Calif. 90603

[21] Appl. No.: 944,183

[22] Filed: Dec. 22, 1986

[51] Int. Cl.$^4$ .............................................. H02H 9/04
[52] U.S. Cl. .................................... 361/118; 361/58; 361/126; 361/133
[58] Field of Search ................. 361/58, 111, 112, 113, 361/117, 118, 119, 120, 126, 133

[56] References Cited

U.S. PATENT DOCUMENTS

| | | | |
|---|---|---|---|
| 4,259,705 | 3/1981 | Stifter | 361/118 X |
| 4,455,586 | 6/1984 | McCartney | 361/120 |
| 4,553,189 | 11/1985 | Pivit et al. | 361/119 |
| 4,563,720 | 1/1986 | Clark | 361/56 |

FOREIGN PATENT DOCUMENTS 2544923 10/1984 France ................. 361/117

*Primary Examiner*—A. D. Pellinen
*Assistant Examiner*—H. L. Williams

[57] ABSTRACT

A high-voltage system surge eliminator for the protection of electric transmission and distribution stations against line and switching transients, atmospheric discharges and other adverse effects including such as those caused by lightning. The eliminator is suitable for the protection of substations and of individual equipment units, selectively, and is applicable to both direct current and alternating current single and multi-phase systems, selectively. Two basic and typical eliminator varieties are shown and described.

2 Claims, 2 Drawing Sheets

HIGH-VOLTAGE SYSTEMS SURGE ELIMINATORS FOR TRANSMISSION LINES AND DISTRIBUTION STATION PROTECTION

BACKGROUND

Electric transmission lines and distribution stations, especially those of the outdoor variety and substation classification, are especially exposed to and vulnerable by voltage surges, transients and atmospheric discharges, including those caused directly and indirectly by lightning.

Various methods, means and devices are known to protect electric distribution systems and transmission lines and equipment supplied by them.

In considerable contrast to practices of prior art, the subject invention pertains to a high-voltage type surge eliminator which, when inserted in a series hybrid configuration with an incoming high-voltage transmission line and its ground plane, will arrest and absorb, respectively, any manifestation which would have resulted in power surges, high-voltage transients and momentary overvoltages, selectively and jointly, and which would, if not prevented to exist, damage component parts of the, for example, station supplied by the transmission or distribution line.

This invention can be practiced in at least two operationally equivalent modifications, namely, through a single package containing the three required elements or three individual elements erected in the appropriate physical mutual relationship and in either case, connected with the transmission line at the respective strategic locations.

The high-voltage surge eliminator configuration is capable of intercepting and dissipating, respectively, the energy from any lightning-related surge or from any switching transient entering the station through the thusly protected transmission line interface. It is capable of performing this function repeatedly without failure or loss of service occurring as a consequence of these anomalies. In addition thereto, the eliminator configurations do not generate any significant transients in the process of their normal operation.

The eliminator configurations bar the possibility of the passage of any of these potentially damaging transient phenomena into the transmission and distribution stations, respectively.

The component parts of the herein described high-voltage type surge eliminator configurations are designed to resist the effect of weather and other ambient conditions and are capable of providing trouble-free operation for a period of at least ten years.

The eliminator configurations lend themselves for straightforward installation with planned substation layouts as well as for the respective modifications of existing substations.

Further features and advantages of the subject improvement will become more apparent from the following description and the accompanying drawing.

In the drawing, forming a part of this application:

FIG. 1 is a schematic of the subject high-voltage surge eliminator showing its component parts within a typical electric circuit, FIG. 2 illustrates in a simplified isometric view a typical a.c. three-phase transmission line outdoor installation equipped with, in this example, three of the subject high-voltage surge eliminators of the discrete element variety, FIG. 3 portrays, likewise in isometric projection, a high-voltage surge eliminator variety having only one surge interceptor and one low-energy arrestor with connecting leads to, in this example, an a.c. single-phase transmission line and FIG. 4 shows, also in an isometric view, a surge interceptor assembly in accordance with the subject teachings.

DETAILED DESCRIPTION

Figure 1:
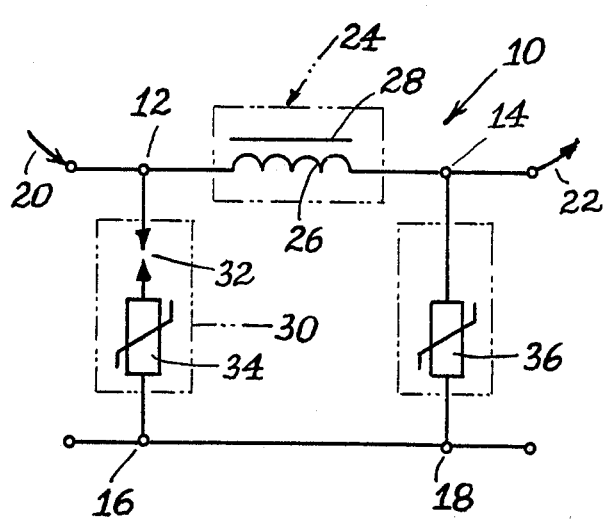

Referring now to the drawing, wherein like reference numerals designate like or corresponding parts and, more particularly, to FIG. 1, it presents the schematic of a typical single high-voltage type surge eliminator (hereinafter called "eliminator") 10 for interface connection with a transmission line, at the terminals 12, 14, 16 and 18.

Figure 2:
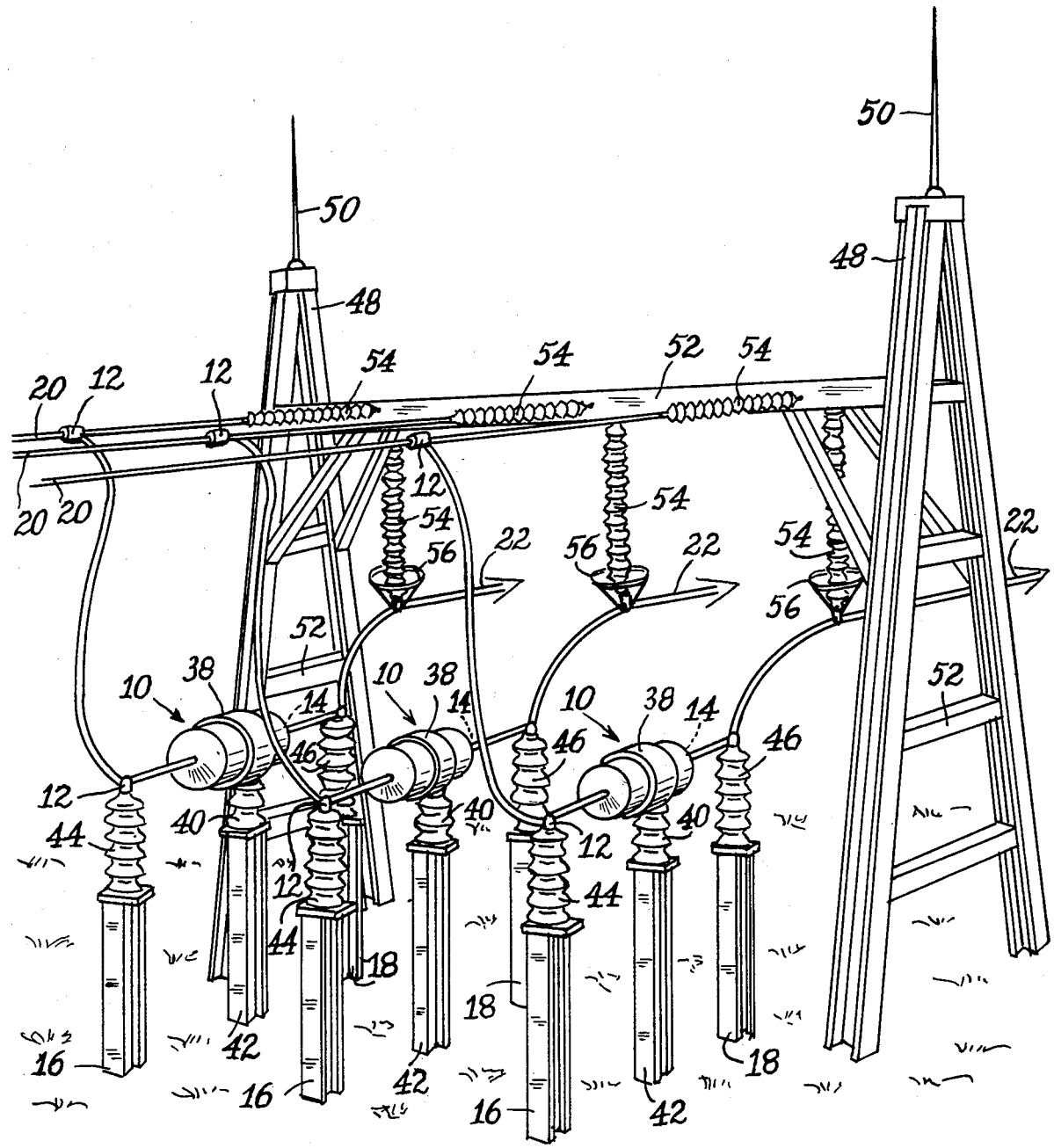

The incoming transmission line wire 20 is connected to terminal 12 and the outgoing wire 22 is connected with terminal 14 of the eliminator 10. The outgoing wire 22 may be a continuation of a transmission line, as shown in FIG. 2, and connected to an incoming terminal of another equipment (not shown), selectively, depending on the intended protection. A traditional surge interceptor 24, of essentially invariable operational characteristics shown symbolically and consisting substantially of a choke coil 26, having a metallic core 28, is connected with the coil terminals in series between the terminals 12 and 14 of the eliminator 10.

A high-energy surge arrrestor 30 consisting of a spark gap 32 in series with an avalanche type solid state device 34 is connected across terminal 12 and the station ground plane 16. Conversely, a low-energy arrestor 36 is connected across the terminal 14 and the substation ground plane 16.

The actual installation and typical component parts arrangement, in this case for an a.c. three-wire, three-phase electric system is reflected in FIG. 2, showing one eliminator 10 per phase.

Each such eliminator 10 is connected with its terminal 12 to an incoming transmission line 20 and with its terminal 14 (hidden) to an outgoing transmission line 22. The sturdy enclosure 38 of each eliminator 10 is mounted on an insulator 40 which, in turn, is fixedly positioned on an upright structural post 42 which is installed in the ground. Each high-energy surge arrestor 30 is contained within the hollow interior of each insulator 44, whereas each low-energy arrestor 36 is lodged within the hollow interior of each insulator 46. The terminals 12 of each said high-energy surge arrestor are connected to the respective incoming transmission line wires whereas the terminals 16 are established by the ground post 16. In turn, the terminals 14 of the low-energy arrestors 36 are connected with the respective outgoing transmission line wires 22 and the terminals 18 are provided by the grounded posts 18. It should be noted that, in this example, the structural posts 42 do not carry any current. Conventional structural supports 48 having, for example, lightning rods 50 mounted on their tops, braces 52, insulators 54 and arc deflectors 56 complete the installation description.

Figure 3:
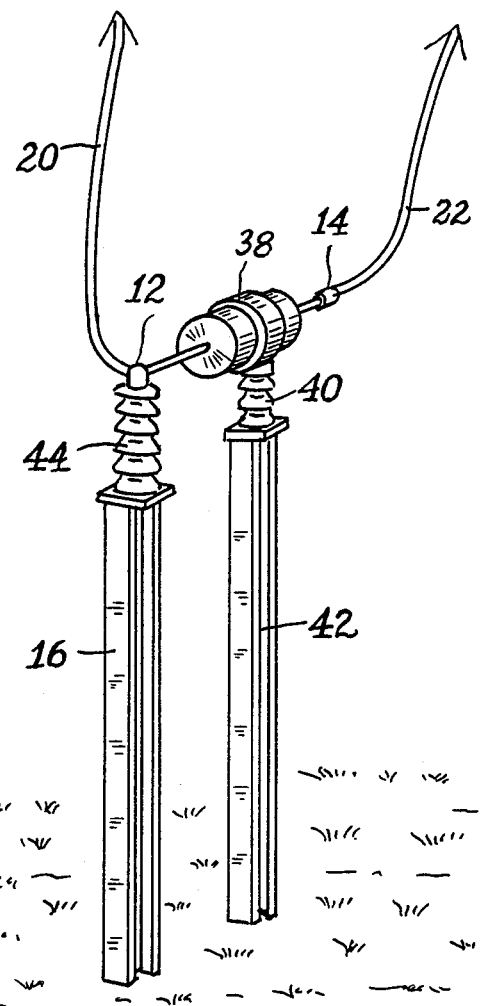

An eliminator type having only one high-voltage surge interceptor 24 and one low-energy arrestor 36 is illustrated in FIG. 3. The enclosure 38, inside of which the high-voltage surge interceptor 24 is positioned, is mounted on the insulator 40 located on top of the structural post 42, the latter being installed in the ground. The terminal 12 is connected to the, in this case single, incoming transmission line 20, whereas the terminal 16 is established by the ground post 16. The terminal 14 is connected to the outgoing transmission line 22. To preclude ambiguity, the auxiliary electrical component parts and the structural members shown in FIG. 2 and partly applicable to the installation of parts illustrated in FIG. 3 were omitted from this figure.

Figure 4:
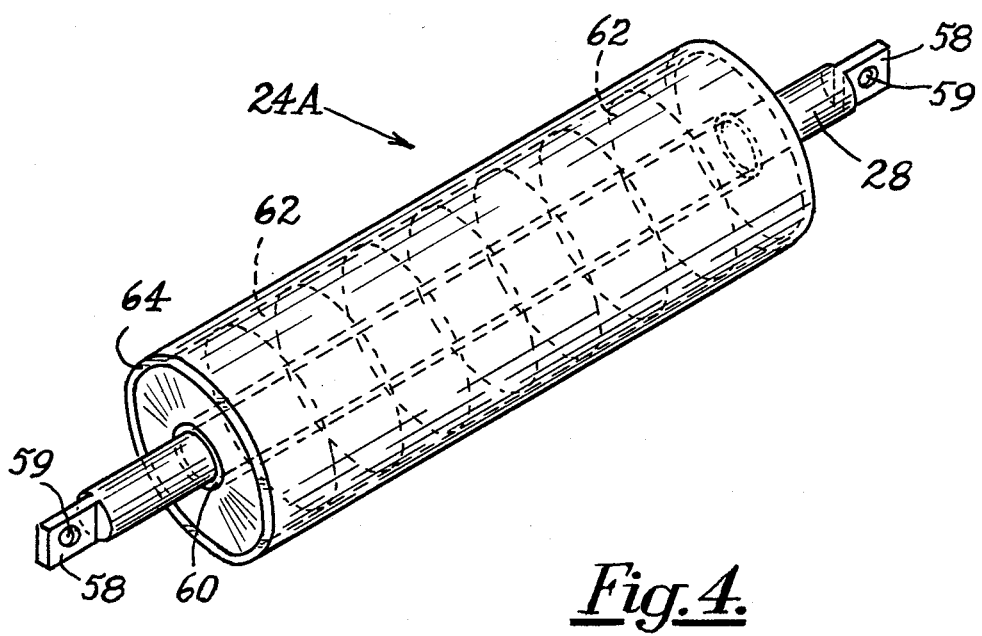

An alternate and variably adjustable high-voltage surge interceptor assembly 24A is illustrated in greater detail in FIG. 4. It has means for insertion into an electric circuit and means for placing on said means for insertion for the purpose of varying the electrical and physical reactive impedance of said circuit to provide the required protection. The metallic core 28 of an electrically conductive material, being said means for insertion, has a flat 58 and a hole 59 formed therein at each of its two ends for connection with the terminals 12 and 14, respectively, as shown in FIG. 1. A first cylindrical tubing 60 of an electrically nonconductive material such as, for example, mylar is placed over the core 28 extending from one of its flats 58 to the other, acting as an electric and protective insulator. At least one toroidally-shaped member 62—being said means for placing on said means for insertion—is positioned over both said first cylindrical tubing 60 and core 28. Depending on the required impedance of the surge interceptor 24A, additional toroidally-shaped members 62 may be placed side-by-side along the length of the core 28. A second, also protective, cylindrical tubing 64 of a suitable electrical insulating material is installed as casing over the first, mylar, tubing and the toroidally-shaped member 62 of the surge interceptor assembly 24A. The high-voltage surge interceptor assembly 24A may be installed on top of an earth-mounted, electrically insulated support. Depending on its weight and the accessibility to nearby structural members including cable runs, such an interceptor assembly 24A may be installed on and thusly suspended by these elements. An interceptor of this variety is, likewise, connected with one of its flats 58 and holes 59 to the incoming terminal 12 and in series with the other flat 58 and hole 59 to the outgoing terminal 14.

The operation of the subject high-voltage surge arrestor 30 is based on the following factors: It is a standard, substation-class arrestor, for selection on the basis of its energy-handling capability, its life expectancy and the system voltage. It is designed to negotiate the maximum lightning and related surge-energy and, in addition thereto, any follow-on current resulting from the arrestor operations. The maximum 99.9 percentile lightning-related surge energy is considered to be 200,000 joules. The maximum surge current is assumed to be 400,000 amperes peak for an 8 by 20 microseconds surge pulse. The earlier mentioned life expectancy is a function of the area of application and its related exposure risk. Most existing substations will satisfy this functional requirement.

In view of the aforementioned description of parts and of the operational parameters, possible methods of implementation for a conventional substation are as follows:

One principle involves the use of a secondary-stage, high-energy, surge arrestor whereas the other mode operates without it, based on the following decisive factors: Assuming a surge arrives at the junction to the station, it is carried in wires having generous, large-radii turns, if any, directly to the terminal(s) 12 of the high-voltage surge arrestor(s) 30. The path through the high-voltage surge interceptors 24 and 24A, respectively, presents a high impedance to the surge and a low impedance to the rated operating power, thusly stopping the surge energy at that junction, storing it momentarily in the surge interceptor 24 and 24A, respectively, and then releasing it through the high-energy surge arrestor 30 after it responds to its "on" condition. Any leakage energy, such as a voltage overshot, is dissipated in the low-energy arrestor 36.

Whereas the operations and applications were described with reference to alternating current distribution systems, the subject principles, elements and component parts lend themselves readily and with appropriate minor modifications, respectively, for use with direct current distribution systems of the two and three-wire lines varieties, selectively.

It is understood that the herein shown and described embodiments of the subject invention are but illustrative and that variations, modifications and alterations are feasible within the spirit of these teachings.

I claim:

1. A high-voltage surge eliminator for the protection of high-voltage electric circuits against the effects of transients and atmospheric discharges, including those caused by lightning and switching transients, having a typical high-energy surge arrestor and a low-energy, metal-oxide arrestor, separated by a surge interceptor comprising:
    a low-capacitance reactance reactor type high-voltage surge interceptor
    having a conductor core of an electrically conductive material and an electric conductor, selectively,
    a first cylindrical tubing of an electrically nonconductive material enveloping said conductor core and said electric conductor, respectively,
    at least one toroidally-shaped member of a first configuration placed upon said first tubing,
    said toroidally-shaped member
        formed from a tape of a magnetically conductive material,
        shaped from a magnetic material,
        formed from an electrically conductive, short-circuited winding, selectively,
    a second cylindrical tubing of an electrically nonconductive material enveloping said at least one toroidally-shaped member,
    said toroidally-shaped member in a manner that does not introduce any electric capacity between the input-and-output terminals of said surge interceptor.

2. A high-voltage surge interceptor as defined in claim 1, wherein
    additional toroidally-shaped members are placed upon said first tubing of said low-capacitance reactive reactor type high-voltage surge interceptor, said toroidally-shaped members being of identical configurations and materials and varying from each other by material and configuration selectively, to vary the inductance of said low-capacitance reactive reactor to suit varied operating requirements.

* * * * *